US012694658B2

(12) United States Patent
Scharfenberger et al.

(10) Patent No.: US 12,694,658 B2
(45) Date of Patent: Jul. 28, 2026

(54) CORRECTION OF IMAGES FROM A CAMERA IN CASE OF RAIN, INCIDENT LIGHT AND CONTAMINATION

(71) Applicant: Continental Autonomous Mobility Germany GmbH, Ingolstadt (DE)

(72) Inventors: Christian Scharfenberger, Lindau (DE); Michelle Karg, Lindau (DE)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 348 days.

(21) Appl. No.: 18/266,849

(22) PCT Filed: Nov. 26, 2021

(86) PCT No.: PCT/DE2021/200207
§ 371 (c)(1),
(2) Date: Jun. 13, 2023

(87) PCT Pub. No.: WO2022/128013
PCT Pub. Date: Jun. 23, 2022

(65) Prior Publication Data
US 2025/0086954 A1     Mar. 13, 2025

(30) Foreign Application Priority Data
Dec. 15, 2020     (DE) ...................... 10 2020 215 859.2

(51) Int. Cl.
*G06V 10/00*     (2022.01)
*G06V 10/26*     (2022.01)
(Continued)

(52) U.S. Cl.
CPC ............ *G06V 10/82* (2022.01); *G06V 10/273* (2022.01); *G06V 10/774* (2022.01); *G06V 10/776* (2022.01); *G06V 20/56* (2022.01)

(58) Field of Classification Search
CPC ............ G06N 3/02; G06N 3/08; G06N 3/042; G06N 3/045; G06N 3/047; G06N 3/082;
(Continued)

(56) References Cited

U.S. PATENT DOCUMENTS

| | | | |
|---|---|---|---|
| 9,965,719 B2 * | 5/2018 | Choi ...................... | G06N 3/045 |
| 10,049,284 B2 * | 8/2018 | Jain ................... | G06V 30/19173 |

(Continued)

FOREIGN PATENT DOCUMENTS

| | | |
|---|---|---|
| CN | 109840911 A | 6/2019 |
| CN | 111063021 A1 | 4/2020 |

(Continued)

OTHER PUBLICATIONS

Office Action (Request for the Submission of an Opinion) issued Apr. 25, 2025, by the Korean Intellectual Property Office in corresponding Korean Patent Application No. 10-2023-7014848 and an English translation with the Concise Statement of Relevance of the Office Action. (24 pages).

(Continued)

*Primary Examiner* — Amir Alavi
(74) *Attorney, Agent, or Firm* — Buchanan Ingersoll & Rooney PC

(57) ABSTRACT

A machine learning method, a method, and an apparatus for correcting input image data, which are negatively influenced by rain, incident light and/or dirt, from a camera, for example a vehicle-mounted environment-capturing camera are disclosed. The method providing input image data captured by the camera to a trained artificial neural network. The trained artificial neural network is configured to convert the input image data into output image data without negative influence and to determine a certainty measure c which is dependent on the degree of wetting by water, incident light and/or contamination for an image of the input image data (Continued)

and characterizes the certainty of the network that the image correction of the network is accurate. The trained artificial neural network is configured to output the output image data and the determined certainty measure c.

11 Claims, 3 Drawing Sheets

(51) Int. Cl.

| | |
|---|---|
| *G06V 10/774* | (2022.01) |
| *G06V 10/776* | (2022.01) |
| *G06V 10/82* | (2022.01) |
| *G06V 20/56* | (2022.01) |

(58) Field of Classification Search

CPC ...... G06N 3/088; G06N 3/092; G06N 3/0454; G06N 3/0475; G06N 3/0464; G06N 20/00; G06N 20/10; G06N 20/20; G06V 10/82; G06V 10/761; G06V 10/762; G06V 10/764; G06V 10/765; G06V 10/243; G06V 10/772; G06V 10/273; G06V 10/774; G06V 20/58; G06V 20/56

See application file for complete search history.

(56) References Cited

U.S. PATENT DOCUMENTS

| | | | | |
|---|---|---|---|---|
| 10,427,645 | B2 * | 10/2019 | Karandikar | G06N 3/084 |
| 10,657,425 | B2 * | 5/2020 | Martinello | A61B 3/0058 |
| 10,783,394 | B2 * | 9/2020 | Molchanov | G06N 3/088 |
| 11,531,197 | B1 * | 12/2022 | Grisleri | H04N 23/682 |
| 11,620,522 | B2 * | 4/2023 | Potnis | G06F 18/217 |
| | | | | 382/104 |
| 11,928,589 | B2 * | 3/2024 | Choi | G06V 10/764 |
| 12,196,569 | B2 * | 1/2025 | Yashunin | G06V 20/58 |
| 2015/0220792 | A1 | 8/2015 | Strauss et al. | |
| 2019/0164271 | A1 | 5/2019 | Herchenbach et al. | |
| 2020/0051217 | A1 | 2/2020 | Shen et al. | |
| 2020/0090322 | A1 | 3/2020 | Seo et al. | |
| 2020/0204732 | A1 | 6/2020 | Yadav et al. | |
| 2020/0273153 | A1 | 8/2020 | Hiramaki | |
| 2020/0342574 | A1 | 10/2020 | Meinke | |
| 2021/0255620 | A1 * | 8/2021 | Bielby | G05D 1/0088 |

FOREIGN PATENT DOCUMENTS

| | | |
|---|---|---|
| CN | 112085680 A1 | 12/2020 |
| DE | 102019205962 A1 | 10/2020 |
| WO | 2013083120 A1 | 6/2013 |

OTHER PUBLICATIONS

Chen Ruilong et al. "A Deep Learning Framework for Joint image Restoration and Recognition", Circuits, Systems, and Signal Processing (2020) 39:1561-1580 https://doi.org.1007/s00034-019-01222=x, 2019.

Horia Porav et al. "Rainy screens: collecting rainy datasets, indoors." 2020.

Horia Porav et al. "I Can See Clearly Now : Image Restoration via De-Raining", 2019.

Hanna Kamyshanska et al. "On autoencoder scoring", http://proceedings.mlr.press/v28/kamyshanska13.pdf, 2013.

M. Uricar et al. "Let's Get Dirty: GAN Based Data Augmentation for camera Lens soiling Detection in Autonomous Driving", 2020.

Hamzeh Yazan et al. "A Review of Detection and Removal of Raindrops in Automotive Vision Systems", Journal of Imaging, 2021.

Search Report dated Oct. 12, 2021 from corresponding German patent application No. 10 2020 212 859.2.

International Search Report and Written Opinion dated Mar. 18, 2022 from corresponding International patent application No. PCT/DE2021/200207.

Notice of Reasons for Refusal drafted on Jan. 5, 2024 for the counterpart Japanese Patent Application No. 2023-526114 and machine translation of same.

Decision to Grant a Patent drafted on Apr. 30, 2024 for the counterpart Japanese Patent Application No. 2023-526114 and machine translation of same.

Office Action (The First Office Action) issued Nov. 7, 2025, by the State Intellectual Property Office of People's Republic of China in corresponding Chinese Patent Application No. 202180078979.2 and an English translation of the Office Action. (17 pages).

* cited by examiner

CORRECTION OF IMAGES FROM A CAMERA IN CASE OF RAIN, INCIDENT LIGHT AND CONTAMINATION

CROSS-REFERENCE TO RELATED APPLICATIONS

The present application is a National Stage Application under 35 U.S.C. § 371 of International Patent Application No. PCT/DE2021/200207 filed on Nov. 26, 2021, and claims priority from German Patent Application No. 10 2020 215 859.2 filed on Dec. 15, 2020, in the German Patent and Trademark Office, the disclosures of which are herein incorporated by reference in their entireties.

TECHNICAL FIELD

The technical field relates to a machine learning method, a method, and an apparatus for correcting images from a camera in case of rain, incident light or contamination, for example a vehicle-mounted environment-capturing camera.

BACKGROUND

Today's vehicles, and future vehicles, are/will be equipped with camera-based assistance systems which serve to recognize objects in order to avoid collisions and to recognize road boundaries to keep the vehicle within the lane. To this end, forward-looking cameras are used, for example, which realize a detection or representation function either alone or in combination with surround-view cameras.

Concepts exist for forward-looking cameras which comprise a detection function for detecting rain. Combined with camera-based daylight recognition for controlling the vehicle headlights, a so-called rain light detector can be realized with a camera, which rain light detector recognizes rain on the windshield and activates the windshield wipers, for example.

The recognition algorithms based on these camera systems already partially combine approaches of classical image processing with approaches from machine learning, in particular deep learning. Classical approaches to recognizing objects or structures as part of the image processing are based on manually selected features, while approaches based on deep learning establish and optimize relevant features in the training method itself.

The camera systems indicated above exhibit degradation both in the recognition of objects and in the representation of the surroundings or objects, which occurs, however, as soon as the visibility in a situation is negatively influenced by rain, incident light or dirt.

If the view of the front camera which is installed, for example, in the base of the interior mirror is restricted by water drops on the windshield or dirt, visibility can be restored by operating the windshield wipers. The precondition for this is that the installation position of the camera is in the wiping range of the windshield wipers.

Due to the emerging automation of vehicles, the number of forward-looking cameras is increasing. These can not only be mounted, in a centered manner, in the base of the mirror, but in the proximity of the A pillar in the upper corners of a windshield. Said regions are more critical for detection functionalities since they are located outside the wiping range of the windshield wipers. Visibility restricted by raindrops or dirt has an adverse effect on detection functions.

As the degree of automation of vehicles increases from SAE Level 2+ to SAE Level 4/Level 5 or in the case of automated parking or visualization, cameras mounted on the sides of a vehicle will probably be used in future, which, in addition to displaying the surroundings, also serve to detect lateral objects. If the lenses are wet due to water drops or covered with dirt, the display or detection functionality can also be very restricted here. Due to the lack of cleaning possibilities such as windshield wipers, this leads to degradation or a failure of a system.

Reversing cameras which, for the most part, are installed above the license plate and get dirty very quickly, are indicated as a final example. Here as well, rain or dust can cause fogging, which makes a clean display difficult.

While convolutional neural network (CNN)-based methods for object recognition are to the greatest possible extent able to compensate for contamination or wetting of the lenses by water drops, at least up to a certain extent, methods for object recognition based on image features such as, e.g., optical flow or structure-from-motion, suffer severe degradation due to contamination.

Algorithmic methods for detecting dirt or precipitation on the outer lens of a camera or on the windshield of a vehicle are known.

WO 2013/083120 A1 discloses a method for evaluating image data from a vehicle camera, in which information about raindrops on a windshield within the field of view of the vehicle's camera is taken into account during the evaluation of the image data. The information about raindrops can, for its part, be determined from the image data. A recognition of objects, which then takes account of the information in a targeted manner, is indicated as an example of the evaluation of the image data. For example, the influence on the edges seen by the camera (light/dark or color transitions) can be estimated from a recognized rain intensity. Edge-based evaluation methods can be adjusted accordingly in their threshold values. In particular, a quality criterion of the image data can be derived from the information, which is then taken into account during the evaluation of the image data.

In "I Can See Clearly Now: Image Restoration via De-Raining", 2019 IEEE Int. Conference on Robotics and Automation (ICRA), Montreal, Canada, pages 7087-7093, accessed on 13.7.2020 at:

http://www.robots.ox.ac.uk/~mobile/Papers/
ICRA19_porav.pdf, H. Porav et al. demonstrate a method for improving segmentation tasks on images which are negatively influenced by adherent raindrops or streaks. To this end, a stereo dataset was generated, in which one lens was negatively influenced by real water drops and the other lens was clear of negative influences. Said dataset was used to train a "denoising generator" in order to remove the effect of the water drops, in the context of image reconstruction and road marking segmentation.

A system would be desirable which algorithmically offers an enhancement of the images despite contamination, incident light or water drops, for example in order to improve downstream object recognition and, additionally, makes possible a function for rain and light recognition (rain+light detection).

SUMMARY

A method for machine learning according to the disclosure relates to an image correction of input image data, which are negatively influenced by rain, incident light and/or dirt, from a camera, into output image data by means of an artificial neural network. The learning is effected with a plurality of pairs of training images in such a way that, in each case, a first image negatively influenced by rain, incident light and/or dirt is provided at the input of the artificial neural network and a second image of the same scene without negative influence is provided as the nominal output image. The artificial neural network is designed in such a way that it determines a certainty measure c which is dependent on the degree of wetting by water, incident light and/or contamination for an input image. The network can be designed, for example, by a corresponding design or a corresponding architecture of the artificial neural network. Following the conclusion of the machine learning, the artificial neural network may establish and output the certainty measure c for a new input image. That is to say that the certainty measure c is dependent on the degree of the negative influence caused by wetting with rain or water, by incident light and/or by contamination and, during utilization of the trained network, characterizes the certainty that an image correction is accurate.

The certainty measure c characterizes, to a certain extent, the "uncertainty" with which an image correction is effected by the trained neural network.

In other words, the certainty measure c is dependent on the negative influence of the input image data and characterizes the certainty of the network that the image correction of the network is accurate.

The artificial neural network can, for example, be a convolutional neural network (CNN).

As a general rule, the conversion into output image data "without negative influence" includes the conversion into output image data having a reduced negative influence.

The camera may be, for example, a (monocular) camera which is fastened in or on a vehicle, which captures the environment of the vehicle. An example of such a vehicle-mounted camera is a camera arranged behind the windshield in the interior of the vehicle, which can capture and map the region of the vehicle surroundings lying in front of the vehicle through the windshield.

The effect of a negative influence on a camera image by rain, incident light or dirt is similar in that it results in (local) blurring in the image. In all of these cases, an image correction which reduces or eliminates this blurriness in the image is desirable.

According to an embodiment, at least one factor d is determined as a measure of the difference between the corrected output image and the negatively influenced input image and is provided to the artificial neural network as part of the training.

The factor d is taken into account by the artificial neural network during learning, for example in such a way that the neural network trains the linking of the input image, output image and factor d. As a result, the trained network can later estimate or establish a factor d for a currently captured negatively influenced camera image and can produce (or reconstruct) an output image which has been greatly corrected accordingly. That is to say that, following the conclusion of the training, a factor d can be predefined for the trained neural network, for example, and, as a result, the degree of correction of the currently captured camera image can be controlled.

The factor d can be determined, for example, by means of a local comparison of an undisturbed image with that of an image negatively influenced by rain or dirt.

In this case, the factor d can be established with the help of 2D filters which can be mapped, for example, in the input layers of an artificial neural network.

In a simple embodiment, the factor d can be represented as the variance of a 2D low-pass filter. Alternatively, more complex contrast values (structural similarity) or correlations (sum of absolute distances—SAD, sum of squared distances—SSD, zero-means normalized cross correlation—ZNCC), which are calculated from the two images with local filters, are equally conceivable.

For example, a disturbed image is created in the event of a camera lens being contaminated by rain or dirt, which may possibly make object recognition more difficult. As part of the machine learning method, a factor d can be established from a comparison of the nominal output image and the associated negatively influenced input image. This can be established in advance, i.e., a factor d already exists for each pair of training images. Alternatively, the factor d can be established purely on the basis of the pairs of training images as part of the learning method.

A value can be provided by the factor d, which indicates the degree of a possible reconstruction of the corrected image and is also given to subsequent image processing or image display functions. For example, a low value can indicate a high correction, while a high value can indicate a low correction for the further processing stages and can be taken into account when determining the quality of the produced object data-just like the certainty measure c.

In an embodiment, the pairs of training images are produced in that, in each case, a first image negatively influenced by rain, light and/or dirt (in the optical path of the camera) and a second image without negative influence are acquired with different exposure times simultaneously or immediately after another, or are captured by the camera.

According to an embodiment, the pairs of training images contain at least one sequence of consecutive input and output images (as image data). In other words, image sequences (video sequences) are utilized as image data. In this case, at least one input video sequence and one nominal video sequence are required for the machine learning.

When using image sequences, temporal aspects or relationships in the reconstruction (or image correction) can advantageously be taken into account. Raindrops or dirt particles which move over time are indicated as an example. This creates regions in the image which had a clear view at a time t and a view disturbed by rain at a time t+1. By using image sequences, information in the clear image regions can be used for reconstruction in the fields of view disturbed by rain or dirt.

The temporal aspect can help to reconstruct a clear image, in particular in the case of the regions covered by dirt. In an example, regions of the lens are covered by dirt and other regions are clear. At a point in time t, an object can be seen completely, at another point in time t+1 dirt prevents the object from being acquired completely. By moving the object and/or moving the camera while driving, the information obtained about the object in the image at time t can now help to reconstruct the image at a time t+1.

In an embodiment, the artificial neural network has a common input interface for two separate output interfaces. The common input interface has shared feature representation layers. Corrected (i.e., converted) image data are output at the first output interface. ADAS-relevant detections of at least one ADAS detection function are output at the second output interface. ADAS stands for Advanced Driver Assistance Systems. Consequently, ADAS-relevant detections are, e.g., objects, items, road users, which represent important input variables for ADAS/AD systems. The artificial neural network comprises ADAS detection functions, e.g., lane recognition, object recognition, depth recognition (3D estimation of the image components), semantic recognition, or the like. The outputs of both output interfaces are optimized as part of the training.

A method for correcting input image data, which are negatively influenced by rain, incident light and/or dirt, from a camera, includes the following:

a) input image data acquired by the camera, which are negatively influenced by rain, incident light and/or dirt, are provided to a trained artificial neural network, b) the trained artificial neural network is configured to convert the input image data negatively influenced by rain, incident light and/or dirt into output image data without negative influence and to determine a certainty measure c which is dependent on the degree of wetting by water, incident light and/or contamination for an image (or for each image) of the input image data and characterizes the certainty of the network that the image correction of the network is accurate, and c) the trained artificial neural network is configured to output the output image data and the determined certainty measure(s) c.

The corrected output image data advantageously make possible better machine object recognition on the output image data, e.g., conventional lane/object or traffic sign detection.

According to an embodiment, the factor d is estimated and the negative influence of the currently captured input image data is taken into account in the estimation. Cumulatively or alternatively, the estimation of the factor d of the currently captured input image data can take into account the factor(s) d of the previously captured image data.

According to an embodiment, a temporal development of the factor d can be taken into account when establishing or estimating the factor d. For this purpose, the temporal development of the factor d and a sequence of input images are included in the estimation.

In an embodiment, the camera is a vehicle-mounted environment-capturing camera.

According to an embodiment with a vehicle-mounted environment-capturing camera, information about the current surroundings situation of the vehicle is taken into account when establishing the factor d. Information about the current surroundings situation can comprise, for example, rain sensor data, external (V2X data or data from a navigation system, e.g., GPS receiver having a digital map), spatially resolved weather information and/or information regarding the position of the sun, driving situation information (country road, town/city, motorway, tunnel, underpass). This information can (at least partially) also be obtained from the camera image data via image processing.

For example, the current factor d can be estimated based on surroundings situation information and from the temporal order of images and from the history of the factor d.

Consequently, the factor d can be estimated dynamically when utilizing a trained artificial neural network.

In an embodiment, the corrected image data from the vehicle-mounted environment-capturing camera and the determined certainty measure (or the determined certainty measures) and, optionally, also from the factor d are output to at least one ADAS detection function which determines and outputs ADAS-relevant detections. ADAS detection functions can comprise known edge or pattern recognition methods as well as recognition methods which can recognize and optionally classify relevant image objects by means of an artificial neural network.

In an alternative embodiment, the approach can be extended and the artificial neural network for correcting the image data can be combined with a neural network for ADAS detection functions, e.g., lane recognition, object recognition, depth recognition, semantic recognition. Consequently, hardly any additional outlay in terms of computing time is caused. Following the training, the (first) output interface for outputting the converted (corrected) image data can be eliminated so that when utilized in the vehicle only the (second) output interface is available for the ADAS detections.

In a further embodiment, instead of a reconstruction of unclear or negatively influenced image data, the learned method can be deployed in reverse in order to artificially add rain or dirt from the learned reconstruction profile in acquired image data for a simulation for safeguarding purposes.

In a further embodiment, the learned reconstruction profile can also be enlisted to evaluate the quality of an artificial rain simulation in acquired image data.

According to a further embodiment, the method can be applied in augmented reality and in the field of dash cam and accident recordings.

The disclosure furthermore relates to an apparatus having at least one data processing unit configured to correct input image data, which are negatively influenced by rain, incident light and/or dirt, from a camera, into output image data. The apparatus includes an input interface, a trained artificial neural network, and a (first) output interface.

The input interface is configured to receive input image data which are negatively influenced by rain, incident light and/or dirt, which have been captured by the camera. The trained artificial neural network is configured to convert the negatively influenced input image data into output image data without negative influence and to determine a certainty measure c which is dependent on the degree of wetting by water, incident light and/or contamination for an image or for each image of the input image data and characterizes the certainty of the network that the image correction of the network is accurate.

The (first) output interface is configured to output the converted (corrected) image data and the determined certainty measure(s) c.

According to an embodiment, the input image data include at least one sequence of input images captured one after another as input image data, and the artificial neural network has been trained with the aid of at least one sequence of consecutive input and output images as image data.

The apparatus or the data processing unit may include a microcontroller or processor, a central processing unit (CPU), a graphics processing unit (GPU), a digital signal processor (DSP), an ASIC (Application Specific Integrated Circuit), an FPGA (Field Programmable Gate Array) and more of the same as well as software for performing the appropriate method steps.

According to an embodiment, the data processing unit is implemented in a hardware-based image pre-processing stage (Image Signal Processor, ISP).

In an embodiment, the trained artificial neural network for correcting images is part of an onboard ADAS detection neural network, e.g., for semantic segmentation, lane detection, or object detection, having a shared input interface (input or feature representation layers), and two separate output interfaces (output layers), wherein the first output interface is configured to output the converted output image data and the second output interface is configured to output the ADAS detections (image recognition data).

The disclosure furthermore relates to a computer program element which, when a data processing unit is programmed therewith, instructs the data processing unit to perform a method for correcting images of input image data from a camera into output image data.

The disclosure furthermore relates to a computer-readable storage medium on which such a program element is stored.

The disclosure furthermore relates to the use of a method for machine learning of an image correction of input image data from a camera into output image data for training an artificial neural network of an apparatus having at least one data processing unit.

The present disclosure can, consequently, be implemented in digital electronic circuits, computer hardware, firmware or software.

The main advantages are:

Making possible object recognition in the event of a negative influence (e.g., fogging) of cameras Generating an image data stream for human and computer vision from a neural network for an optimized correspondence search (search for feature correspondence).

In addition to being utilized in motor vehicles, there are various areas of application:

assistance systems in buses, trains, airplanes as well as robotic systems all applications of feature-based detection, e.g., detection methods based on optical flow, structure-from-motion, etc., which experience a dramatic degradation due to missing features in case of negative influences caused by dirt/rain/light consequently, in particular, assistance systems which are based on an optical flow in order to search for features online calibration of cameras, which likewise experience a dramatic loss in performance when wet or contaminated due to missing features or low contrast.

BRIEF DESCRIPTION OF THE DRAWINGS

Exemplary embodiments and figures are described in greater detail below, wherein.

DETAILED DESCRIPTION

Figure 1:
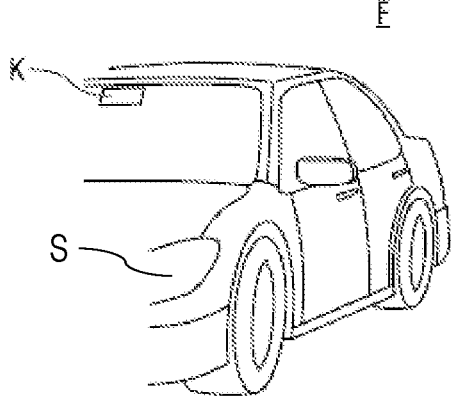
FIG. 1: schematically shows a vehicle having an environment-capturing camera.

FIG. 1 schematically shows a vehicle F having an environment-capturing camera K which is arranged in the interior of the vehicle behind the windshield and captures the environment or the surroundings of the vehicle by means of said camera. In the dark, the headlights S of the vehicle F illuminate the environment in front of the vehicle, which is captured by the camera K. The camera K may be a monocular camera. A sequence of images of the surroundings of the vehicle is captured with the camera K. If the vehicle F is moving, the surrounding region mapped by the camera K is changing continuously.

If there is rain or dirt on the windscreen or an outer camera lens, or if stray light, e.g., sunlight when the sun is low in the sky or in the case of a strong reflection, is incident in the optical path of the camera K, this leads to serious negative influences in the images which the camera K captures.

Figure 2:
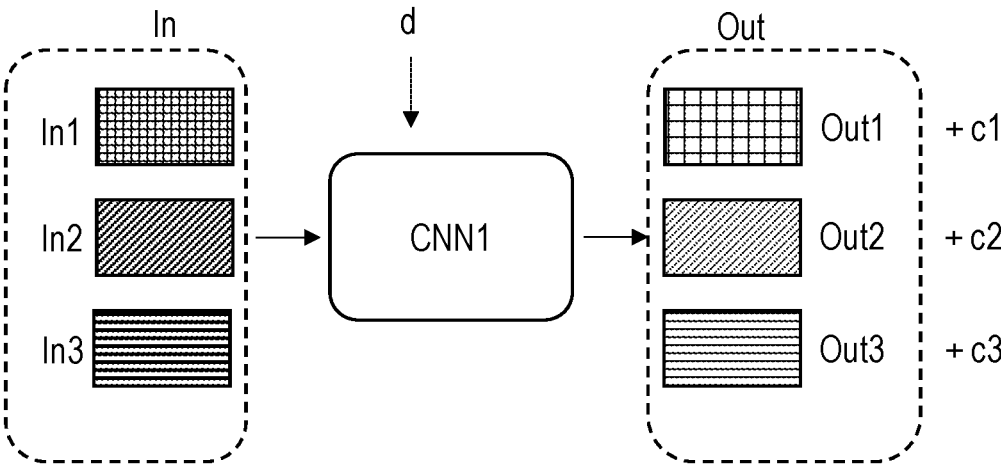
FIG. 2: shows a system for correcting negatively influenced camera images.

FIG. 2 schematically shows a general overview of a system for correcting camera images in case of rain, incident light and/or contamination. An essential component is an artificial neural network CNN1 which learns, in a training phase, to associate a set of corresponding corrected training (nominal) output images Out (Out1, Out2, Out3, . . . ) with a set of training input images In (In1, In2, In3, . . . ). In this context, associating means that the neural network CNN1 learns to generate a corrected image. An input image (In1, In2, In3, . . . ) can contain, e.g., a street scene in the rain, on which only fuzzy or blurred larger objects such as, e.g., a large lane marking representing a bicycle and the sky can be recognized with the human eye. On the corresponding corrected image (Out1, Out2, Out3, . . . ) the contours of a street crossing, a traffic light, a tree and a street lamp can additionally be recognized. Realistic photographic mapping for color images with and without negative influences by raindrops can be seen, for example, in FIG. 1 of Porav et al.

A factor d optionally serves as an additional input variable for the neural network CNN1. The factor d is a control parameter which controls the degree of correction for the negative influence (rain, incident light or dirt) of the image. During training, the factor d can be determined in advance for a pair of images consisting of a training image and a corrected image (In1, Out1; In2, Out2; In3, Out3; . . . ) or as part of the training from the pair of images (In1, Out1; In2, Out2; In3, Out3; . . . ) and can be provided to the neural network CNN1. As a result, the factor d can also be learned.

When utilizing the trained neural network CNN1, it is possible to control, by predefining a factor d, the extent to which the neural network CNN1 corrects a currently captured image—the factor d can also be conceived of as an external regression parameter (having any gradation). Since the factor d can be subject to possible fluctuations in the range of +/−10%, this is taken into account during the training. The factor d can exhibit noise of approx. +/−10% during the training (e.g., during the different periods of the training of the neural network) in order to be robust to misestimates of the factor d in the range of approx. +/−10% during the inference in the vehicle. In other words, the necessary accuracy of the factor d is in the range of +/−10%—consequently, the neural network CNN1 is robust to deviations in estimates of this parameter.

Alternatively or additionally, the factor d can be output by the trained neural network CNN1 for an image correction which has been effected. As a result, downstream image recognition functions receive information about the extent to which the originally captured image has been corrected.

The artificial neural network CNN1 is designed in such a way that it determines a certainty measure c which is dependent on the degree of wetting by water, incident light and/or contamination for an input image. The network can be designed, for example, by appropriately designing the architecture of the artificial neural network CNN1. Following the conclusion of the machine learning, the artificial neural network CNN1 can establish and output the certainty measure c for a new input image. That is to say that the certainty measure c is dependent on the degree of negative influence caused by being wetted by rain or water, by incident light and/or by contamination and, when utilizing the trained network, characterizes the certainty that an image correction is accurate.

In FIG. 2, three pairs of images In1+Out1, In2+Out2, In3+Out3 are depicted schematically. Accordingly, a certainty measure c1, c2 or c3 is determined and output by the trained neural network CNN1 for each pair of images.

Since the quality of the correction of images having rain, incident light or contamination is dependent on numerous factors (such as, e.g., the presence of a similar case in the training data, sufficient exposure for a possible correction, avoidance of ambiguous scenarios, etc.), in addition to correcting the image, the network outputs a measure of the certainty with which the network makes its decision. This certainty measure c can comprise one of the following forms of implementation or a combination of these:

A confidence measure c_Prob: In this case, the output of the network is calibrated in such a way that the latter can be interpreted probabilistically as the probability with which the network is making the right decision. Values for this are normalized to a range between [0,1] and these correspond to the range from a probability of 0% to a probability of 100% that the network has calculated a correct correction of an image. Said calibration may be effected following the conclusion of the actual machine learning method with the aid of a training image dataset by the subsequent verification of the quality of the learning with the aid of a validation image dataset. The validation image dataset also contains pairs of images of, in each case, a first image which is negatively influenced by rain, incident light and/or dirt and a second image of the same scene without negative influence as a corresponding nominal output image. In practice, part of the input and nominal output images can be retained, i.e., not used for the machine learning process, and subsequently used for validation.

A measure of dispersion similar to a standard deviation c_Dev: in this case, an uncertainty of the network output is estimated in such a way that the latter describes the dispersion of the network output. This can be implemented in different ways. Possibilities for this are the subdivision into measurement and modeling uncertainties. The measurement uncertainty relates to uncertainties which are caused by the input data, e.g., slight disturbances. These can be added to the network via a further output and are trained by changing the error function. The modeling uncertainty relates to uncertainties which are caused by the limited mapping accuracy and generalizability of a network. This relates to factors such as the volume of the training data and the architecture of the network design. The modeling uncertainty can be estimated, e.g., by Monte Carlo Dropout or network ensembles. The modeling uncertainty and the measurement uncertainty can be added together.

A Combination of Measures of Confidence and Dispersion

The certainty measure c may be calculated for the entire image, image regions or the individual pixels of the image.

Based on the certainty measure c, the following decisions can be made:

c_Prob low: the network has a low confidence in its estimate—misestimations occur frequently.

c_Prob high: The network has a high confidence in its estimate—the image correction is correct in most cases.

c_Dev low: the dispersion of the image correction of the network is low—consequently, the network predicts a very precise image correction.

c_Dev high: the estimated dispersion of the image correction, similar to a standard deviation, is high and the output of the network is less precise/less sharp—a small change in the input data or in the modeling of the network would cause deviations in the image correction.

Combinations:

c_Prob high and c_Dev low: a very reliable and precise image correction which can be accepted with a high degree of certainty c_Prob low and c_Dev high: a very uncertain and imprecise image correction which would rather be rejected c_Prob high and c_Dev high or c_Prob low and c_Dev low: these corrections are fraught with uncertainties and a judicious use of the image corrections is recommended here The addition of the certainty measures is relevant to safety-critical functions, in particular.

One possibility for producing the training data (training images (In1, In2, In3, . . . ) and associated corrected images (Out1, Out2, Out3, . . . )) consists of acquiring image data with a "stereo camera setup" as described in Porav et al. with reference to FIG. 8 therein: a bi-partite chamber with transparent panels is arranged in front of two identical camera modules located a small distance from one another, the chamber, e.g., in front of the right stereo camera module is sprayed with water drops, while the chamber in front of the left stereo camera module is kept free of negative influences.

In order to simulate a negative influence caused by incident light in a similar manner, a light source can, e.g., only be directed at one chamber, or, in the case of dirt, this can likewise only be mounted on one chamber.

Alternatively, images which are not negatively influenced can be taken to produce the pairs of training images and render the latter poorly with rendering methods which simulate effects of rain, incident light or dirt in the image.

When the neural network CNN1 is trained, an image correction takes place according to the following procedure:

Input image→CNN1

Optional: factor d→CNN1

CNN1→corrected original/output image+certainty measure c.

Figures 3, 4:
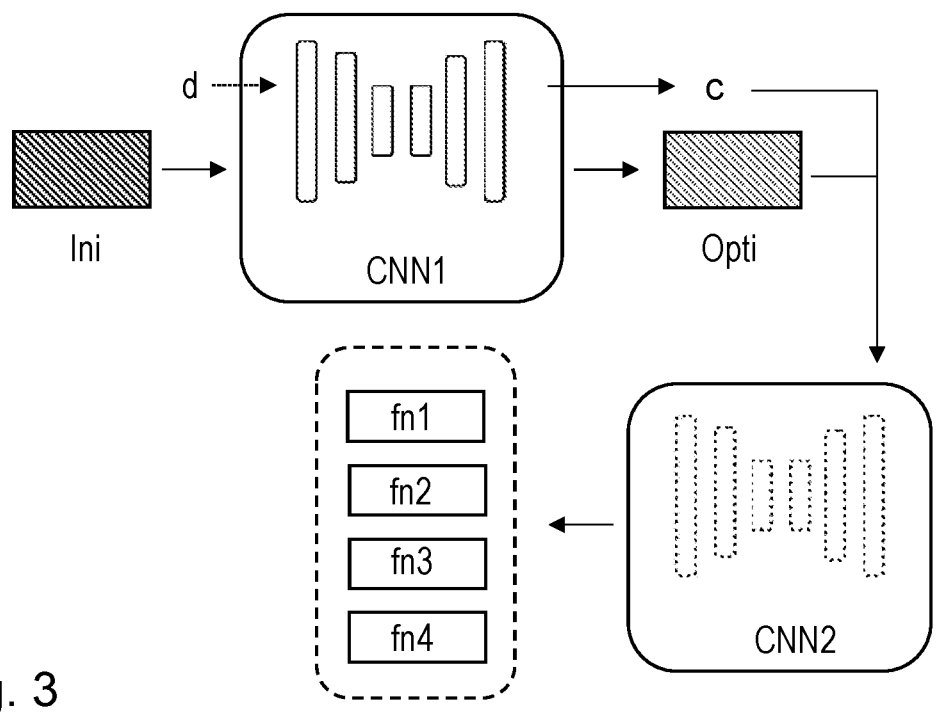
FIG. 3: shows a system having a first neural network for correcting images and a downstream second neural network for detection functions.
FIG. 4: shows a system having combined image correction and detection functions.
Figure 5:
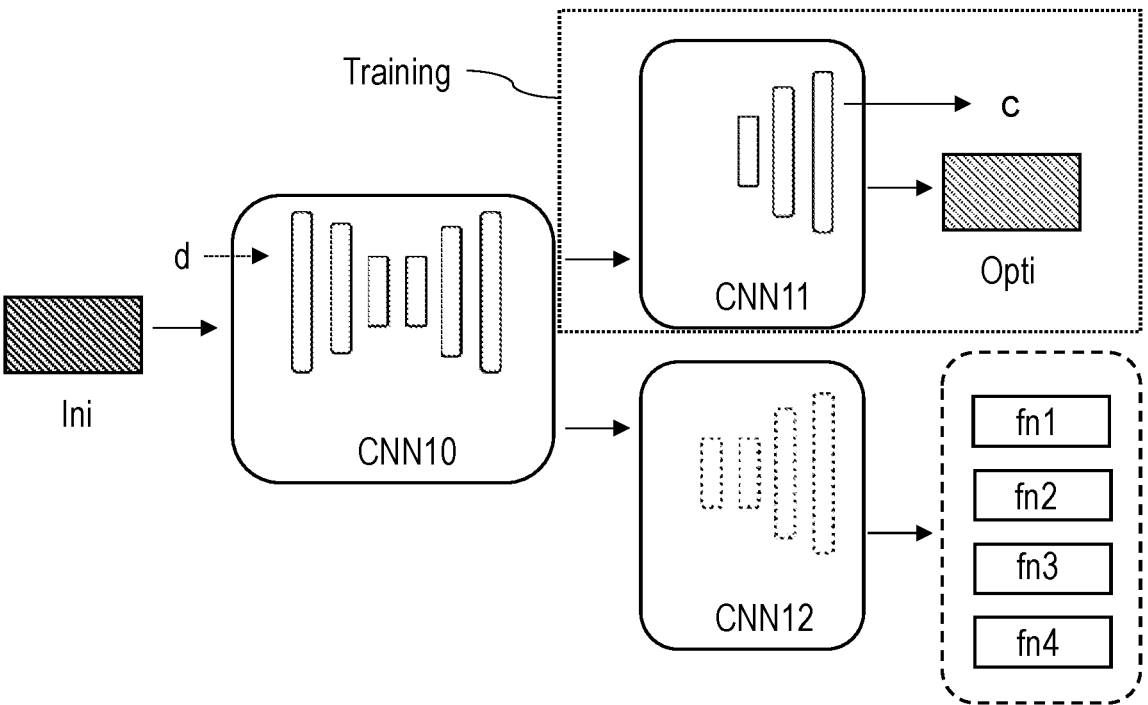
FIG. 5 shows a modified system, in which the image correction is only calculated and output as part of the training.

FIGS. 3 to 5 show exemplary embodiments of possible combinations of a first network for image correction having one or more networks of the functions for driver assistance functions and automated driving, ordered according to the consumption of computing resources.

FIG. 3 shows a system having a first neural network CNN1 for correcting images with a downstream second neural network CNN2 for detection functions (fn1, fn2, fn3, fn4). In this case, the detection functions (fn1, fn2, fn3, fn4) are image processing functions which detect objects, structures, properties (in general: features) relevant to ADAS or AD functions in the image data. Many of such detection functions (fn1, fn2, fn3, fn4), which are based on machine learning, have already been developed or are the subject of current development (e.g., traffic sign classification, object classification, semantic segmentation, depth estimation, lane marking recognition and localization). Detection functions (fn1, fn2, fn3, fn4) of the second neural network CNN2 supply better results on corrected images (Opti) than on the original input image data (Ini) in poor visibility conditions.

If the two neural networks CNN1 and CNN2 are trained, a method can proceed according to the following procedure:

Input image (Ini), optional factor d→CNN1→corrected original/output image (Opti)+certainty measure c→CNN2 for detection functions (fn1, fn2, fn3, fn4)→output of the detections: objects, depth, lane, semantics, . . .

FIG. 4 shows a neural network CNN10 for the image correction of an input image (Ini), possibly controlled by a factor d, which shares feature representation layers (as input or lower layers) with the network for the detection functions (fn1, fn2, fn3, fn4). Common features for the image correction and for the detection functions are learned in the feature representation layers of the neural network CNN 10.

The neural network CNN10 having shared input layers and two separate outputs has a first output CNN 11 for outputting the corrected original/output image (Opti) and the certainty measure c as well a second output CNN 12 for outputting the detections: objects, depth, track, semantics, etc.

The fact that the feature representation layers are optimized both in terms of image correction and detection functions (fn1, fn2, fn3, fn4) during training means that optimizing the image correction simultaneously brings about an improvement in the detection functions (fn1, fn2, fn3, fn4).

If an output of the corrected image (Opti) is then not desired or not required, the approach can be further varied, as explained with reference to FIG. 5.

FIG. 5 shows an approach based on the system of FIG. 4 for the neural network-based image correction by optimizing the features. In order to save computing time, the features for the detection functions (fn1, fn2, fn3, fn4) are optimized during the training in terms of image correction and in terms of the detection functions (fn1, fn2, fn3, fn4).

During the runtime, i.e., when utilizing the trained neural network (CNN 10, CNN11, CNN12), no corrected images (Opti) are calculated.

Nevertheless, the detection functions (fn1, fn2, fn3, fn4)—as already explained—are improved by the common training of image correction and detection functions, compared to a system having only one neural network (CNN2) for detection functions (fn1, fn2, fn3, fn4), in which only the detection functions (fn1, fn2, fn3, fn4) have also been optimized in the training.

In the training phase, the corrected image (Opti) is output by an additional output interface (CNN11) and compared to the ground truth (the corresponding corrected training image). In the test phase or during the runtime, this output (CNN11) can continue to be used or, in order to save computing time, be truncated. During said training with the additional output (CNN11), the weights for the detection functions (fn1, fn2, fn3, fn4) are modified such that they take into account the image corrections for the detection functions (fn1, fn2, fn3, fn4). The weights of the detection functions (fn1, fn2, fn3, fn4) consequently implicitly learn the information about the image correction.

Further aspects and embodiments of an assistance system which algorithmically converts the image data of the underlying camera system into a representation, despite negative influences by rain, incident light or dirt, which corresponds to an acquisition without said negative influences, are set out below. The converted image can then either serve purely for display purposes or as an input for feature-based recognition algorithms.

In a first embodiment, the calculation in a system is based on a neural network, for example, which, located upstream of a detection or display unit, converts an input image with fogging, dirt or water drops with little contrast and color information into a revised representation. For this task, the neural network was trained with a dataset consisting of "fogged input images" and the associated "revised images".

In particular, the neural network is trained by using revised images in such a way that features occurring in the pairs of images to be improved are obtained and, at best, even amplified for a later correspondence search or object recognition, despite fogging or dirt.

When training the network for image correction/improvement, feature-based methods can be taken into account for display and object detection, so that the method is specialized for the features to be recognized and explicitly highlights these features for subsequent processing.

In a further embodiment, the method for improving or correcting images can be integrated in a hardware-based image pre-processing stage, the ISP. This ISP is supplemented by a neural network on the hardware side, which carries out the conversion and makes available the edited information with the original data to possible detection or display methods.

In a further application, information regarding the image quality can be made available to the network for training, in addition to contamination or fogging information. The system and the method can be optimized such that it calculates optimized image data for object recognition and human vision.

In addition to correcting images in the event of fogging or water drops, the system recognizes water drops or dirt for, for example, activating the windscreen wipers or the display to request that a satellite camera be adjusted. In addition to correcting the images, a rain light detection function can be realized in this way, together with brightness detection.

The invention claimed is:

1. A method for machine learning of an image correction of input image data, which are negatively influenced by rain, incident light and/or dirt, from a camera, into output image data by utilizing an artificial neural network, wherein the learning is effected with a plurality of pairs of training images in such a way that, in each case, a first image negatively influenced by rain, incident light and/or dirt is provided at an input of the artificial neural network and a second image of the same scene without negative influence is provided as a nominal output image, wherein the artificial neural network is configured to determine a certainty measure c which is dependent on the degree of wetting by water, incident light and/or contamination for an input image and, following the conclusion of the machine learning, the artificial neural network may establish and output the certainty measure c for a new input image, and wherein at least one factor d is determined as a measure of a difference between the nominal output image and the negatively influenced input image of a pair of training images and is provided to the artificial neural network.

2. The method according to claim 1, wherein the pairs of training images are produced such that, in each case, a first image negatively influenced by rain, incident light and/or dirt and a second image without negative influence are acquired simultaneously or immediately after one another.

3. The method according to claim 1, wherein the pairs of training images include at least one sequence of consecutive input and output images.

4. The method according to claim 1, wherein the artificial neural network has a common input interface for two separate output interfaces, wherein the common input interface has shared feature representation layers, wherein corrected image data are output at the first output interface, wherein ADAS-relevant detections of at least one ADAS detection function are output at the second output interface and wherein the outputs of both output interfaces are optimized as part of the training.

5. The method according to claim 1, wherein the camera is a vehicle-mounted environment-capturing camera.

6. A method for correcting input image data, which are negatively influenced by rain, incident light and/or dirt, from a camera, said method comprising:

providing input image data captured by the camera, the images being negatively influenced by rain, incident light and/or dirt, to a trained artificial neural network, converting the input image data negatively influenced by rain, incident light and/or dirt into output image data without negative influence with the trained artificial neural network, determining a certainty measure c which is dependent on the degree of wetting by water, incident light and/or contamination for an image of the input image data and characterizes the certainty of the network that the image correction of the network is accurate, outputting the output image data and the determined certainty measure c from the trained artificial neural network, and additionally providing a factor d to the trained artificial neural network and, wherein the converting the input image data is controlled as a function of the factor d.

7. The method according to claim 6, wherein the input image data contain at least one sequence of input images captured one after another as input image data.

8. An apparatus having at least one data processing unit configured to correct input image data, which are negatively influenced by rain, incident light and/or dirt, from a camera, into output image data, comprising:

an input interface which is configured to receive the input image data, from the camera, a trained artificial neural network configured to convert the input image data into output image data without negative influence depending on a factor d, which is added to the neural network as an additional input value, and wherein the converting the input image data is controlled as a function of the factor d and to determine a certainty measure c which is dependent on the degree of wetting by water, incident light and/or contamination for an image of the input image data and characterizes the certainty of the network that the image correction of the network is accurate, and a first output interface configured to output the converted output image data and the determined certainty measure c.

9. The apparatus according to claim 8, wherein the data processing unit is implemented in a hardware-based image pre-processing stage.

10. The apparatus according to claim 8, wherein the camera is a vehicle-mounted environment-capturing camera and the trained artificial neural network for correcting images is part of an onboard ADAS detection neural network having a shared input interface, and two separate output interfaces, wherein the first output interface is configured to output the corrected output image data and the second output interface is configured to output the ADAS-relevant detections.

11. The apparatus according to claim 8, wherein the input image data include at least one sequence of input images captured one after another as input image data, and the artificial neural network has been trained with the aid of at least one sequence of consecutive input and output images.

* * * * *